(12) United States Patent
Morton

(10) Patent No.: US 12,015,811 B1
(45) Date of Patent: Jun. 18, 2024

(54) TRANSMISSION METHOD SHORTENS THE TRANSMISSION OF A COPYRIGHTED VIDEO/AUDIO WITHOUT INFRINGING ON COPYRIGHT

(71) Applicant: Derek Stuart Morton, Warwick, NY (US)

(72) Inventor: Derek Stuart Morton, Warwick, NY (US)

( * ) Notice: Subject to any disclaimer, the term of this patent is extended or adjusted under 35 U.S.C. 154(b) by 0 days.

(21) Appl. No.: 17/959,974

(22) Filed: Oct. 4, 2022

(51) Int. Cl.
*H04N 21/2343* (2011.01)
*G11B 27/34* (2006.01)
*H04N 21/845* (2011.01)

(52) U.S. Cl.
CPC ....... *H04N 21/23439* (2013.01); *G11B 27/34* (2013.01); *H04N 21/8456* (2013.01)

(58) Field of Classification Search
CPC ......... H04N 21/23439; H04N 21/8456; G11B 27/34

See application file for complete search history.

(56) References Cited

U.S. PATENT DOCUMENTS

2014/0152760 A1* 6/2014 Granstorm ............... H04N 7/14

\* cited by examiner

*Primary Examiner* — Anthony Bantamoi

(57) ABSTRACT

The Transmission Method discloses how a service provider who is licensed to transmit a copyrighted video/audio, pre-selects segments, or parts, of a copyrighted video/audio, based on their running time, or numerical order of film frames, in a video/audio, and transmits only the pre-selected segments, thereby shortening a copyrighted video/audio without infringing on copyright.

1 Claim, No Drawings

TRANSMISSION METHOD SHORTENS THE TRANSMISSION OF A COPYRIGHTED VIDEO/AUDIO WITHOUT INFRINGING ON COPYRIGHT

CROSS-REFERENCE TO RELATED APPLICATIONS

Not applicable.

BACKGROUND OF THE INVENTION

Shortening the transmission of a copyrighted video/audio without infringing on copyright.

BRIEF SUMMARY OF THE INVENTION

The Transmission Method shortens the transmission of a copyrighted video/audio without infringing on copyright.

A service provider who has a license to transmit a copyrighted video/audio, pre-selects segments, or parts, of a copyrighted video/audio, using an executable script based on a suitable scripting language.

The script controls the transmission of a copyrighted video/audio by transmitting only pre-selected segments, according to their start/stop running time, or numerical order of film frames, in a video/audio.

A service provider uses a simple interpreter to read and execute the script, thereby transmitting a shortened video/audio without infringing on copyright.

Transmission includes streaming, over-the-air/cable/satellite/Internet broadcasting, cinema projection

DETAILED DESCRIPTION OF THE INVENTION

The Transmission Method shortens a copyrighted video/audio, without infringing on copyright.

A service provider who has a license to transmit a copyrighted video/audio, pre-selects segments, or parts, of a copyrighted video/audio using an executable script based on a suitable scripting language.

The script controls the transmission of a copyrighted video/audio by transmitting only pre-selected segments, according to their start/stop running time, or numerical order of film frames, in a video/audio.

A service provider uses a simple interpreter to read and execute the script, thereby transmitting a shortened video/audio without infringing on copyright.

Transmission includes streaming, over-the-air/cable/satellite/Internet broadcasting, cinema projection.

The Transmission Method is a novelty because it shortens a copyrighted video/audio without infringing on copyright.

The Transmission Method is a novelty because the transmission of digital video/audio is new technology, which can be shortened without infringing on copyright.

The Transmission Method is non-obvious because it is Not a professional method of shortening a video/audio.

The Transmission Method is non-obvious because the major Hollywood studios who own the copyrights, do not permit the shortening of videos, and shortening videos has been dormant since 1960s.

The Transmission Method is useful because shortened videos/audios will appeal to a wider audience in home entertainment and will revive forgotten, quality videos/audios.

The invention claimed is:
1. A method comprising:
A service provider who has a license to transmit a copyrighted video/audio;
Who pre-selects segments, or parts, of a copyrighted video/audio, using an executable script, based on a suitable scripting language, to control the transmission of a copyrighted video/audio by transmitting only pre-selected segments, according to their start/stop running time, or numerical order of film frames, in a video/audio;
Who uses a simple interpreter to read and execute the script, thereby, transmitting a shortened video/audio without infringing on copyright.

* * * * *